United States Patent
Ohba et al.

(10) Patent No.: US 8,972,877 B2
(45) Date of Patent: Mar. 3, 2015

(54) INFORMATION PROCESSING DEVICE FOR DISPLAYING CONTROL PANEL IMAGE AND INFORMATION IMAGE ON A DISPLAY

(75) Inventors: Akio Ohba, Kanagawa (JP); Hiroyuki Segawa, Kanagawa (JP); Tetsugo Inada, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 93 days.

(21) Appl. No.: 13/377,608

(22) PCT Filed: May 14, 2010

(86) PCT No.: PCT/JP2010/003286
§ 371 (c)(1),
(2), (4) Date: Feb. 3, 2012

(87) PCT Pub. No.: WO2010/146768
PCT Pub. Date: Dec. 23, 2010

(65) Prior Publication Data
US 2012/0139949 A1    Jun. 7, 2012

(30) Foreign Application Priority Data
Jun. 18, 2009    (JP) .................................. 2009-145578

(51) Int. Cl.
*G06F 3/0482*    (2013.01)
*G06F 3/0489*    (2013.01)

(52) U.S. Cl.
CPC .......... *G06F 3/04892* (2013.01); *G06F 3/0482* (2013.01)
USPC ..... 715/764; 345/530; 348/207.1; 348/333.1; 386/55

(58) Field of Classification Search
CPC . H04N 5/772; H04N 2101/00; G11B 27/105; G11B 2220/2562; G06F 3/0481; G06F 17/30274
USPC ........... 715/810, 838, 764; 348/231.2, 333.05
See application file for complete search history.

(56) References Cited

U.S. PATENT DOCUMENTS 6,563,999 B1    5/2003    Suzuoki
2003/0068157 A1*    4/2003    Kushibe et al. ................. 386/69
(Continued)

FOREIGN PATENT DOCUMENTS

JP    2002-229641 A    8/2002

OTHER PUBLICATIONS

International Search Report for corresponding PCT Application PCT/JP2010/003286, dated Aug. 24, 2010.
(Continued)

*Primary Examiner* — Amy Ng
*Assistant Examiner* — Sang H Kim
(74) *Attorney, Agent, or Firm* — Matthew B. Dernier, Esq.; Gibson & Dernier LLP

(57) ABSTRACT

A control panel image generation unit generates a control panel image displayed to control an application. An application execution unit executes the application based on user control information input while the control panel image is being displayed. An information image generation unit generates an information image including information related to the application. An image switching unit switches an image displayed on a display from the control panel image to the information image. The information image generation unit uses image data stored in a storage device and generates the information image including a thumbnail image corresponding to the control panel image.

8 Claims, 12 Drawing Sheets

(56) References Cited

U.S. PATENT DOCUMENTS

| | | | | |
|---|---|---|---|---|
| 2004/0148101 A1* | 7/2004 | Morita et al. | | 701/211 |
| 2006/0103622 A1* | 5/2006 | Penna et al. | | 345/156 |
| 2006/0156254 A1* | 7/2006 | Satake | | 715/838 |
| 2006/0161847 A1* | 7/2006 | Holecek et al. | | 715/716 |
| 2008/0111822 A1* | 5/2008 | Horowitz et al. | | 345/530 |
| 2008/0184293 A1* | 7/2008 | Yuen et al. | | 725/39 |
| 2009/0119725 A1* | 5/2009 | Park et al. | | 725/106 |
| 2009/0225192 A1* | 9/2009 | Shiohara | | 348/231.2 |
| 2010/0073487 A1* | 3/2010 | Sogoh et al. | | 348/207.1 |

OTHER PUBLICATIONS

International Preliminary Report on Patentability for corresponding PCT Application PCT/JP2010/003286, dated Jan. 17, 2012.

Office Action for corresponding Japanese Patent Application No. 2009-145578, dated Apr. 9, 2013.

* cited by examiner

INFORMATION PROCESSING DEVICE FOR DISPLAYING CONTROL PANEL IMAGE AND INFORMATION IMAGE ON A DISPLAY

TECHNICAL FIELD

The present invention relates to an information processing device in which is used an image processing technology for enlarging/reducing an image displayed on a display, or moving the image upward, downward, leftward, or rightward.

BACKGROUND ART

Home entertainment systems are proposed capable of playing back moving images as well as running game programs. In home entertainment systems, a GPU generates three-dimensional images using polygons.
[patent document No. 1] U.S. Pat. No. 6,563,999

Meanwhile, a technology is proposed capable of enlarging/reducing a displayed image or moving the image upward, downward, leftward, or rightward, using tile images of a plurality of resolutions generated from a digital image such as a high-definition photo. In this image processing technology, the size of an original image is reduced in a plurality of stages to generate images of different resolutions so as to represent the original image in a hierarchical structure where the image in each layer is divided into one or a plurality of tile images. Normally, the image with the lowest resolution comprises one tile image. The original image with the highest resolution comprises the largest number of tile images. An image processing device is configured to enlarge or reduce a displayed image efficiently such that an enlarged view or reduced view is presented by switching currently used tile images to tile images of an appropriate different layer.

SUMMARY OF THE INVENTION

According to the image processing technology, the display resolution is maintained at a high level so that a high-definition image is presented to the user even when the image displayed is enlarged or reduced. We focused our attention to usability of the image processing technology and have considered that, by linking the image processing technology to application software, various benefits (e.g., improvement in usability of the application software) can be given to users.

Accordingly, a purpose of the present invention is to provide an information processing technology whereby the image processing technology is linked to application software.

The information processing device addressing the challenge comprises: a control panel image generation unit configured to generate a control panel image displayed to control an application; an execution unit configured to execute the application based on user control information input while the control panel image is being displayed; an information image generation unit configured to generate an information image including information related to the application; a storage device configured to store image data for generating the information image; and an image switching unit configured to switch an image displayed on the display from the control panel image to the information image. The information image generation unit uses the image data stored in the storage device and generates the information image including a thumbnail image corresponding to the control panel image.

Optional combinations of the aforementioned constituting elements, and implementations of the invention in the form of methods, apparatuses, systems, computer programs, data structures, and recording mediums may also be practiced as additional modes of the present invention.

According to the present invention, an information processing technology whereby an image processing technology is linked to application software is provided.

DETAILED DESCRIPTION OF THE INVENTION

Figure 1:
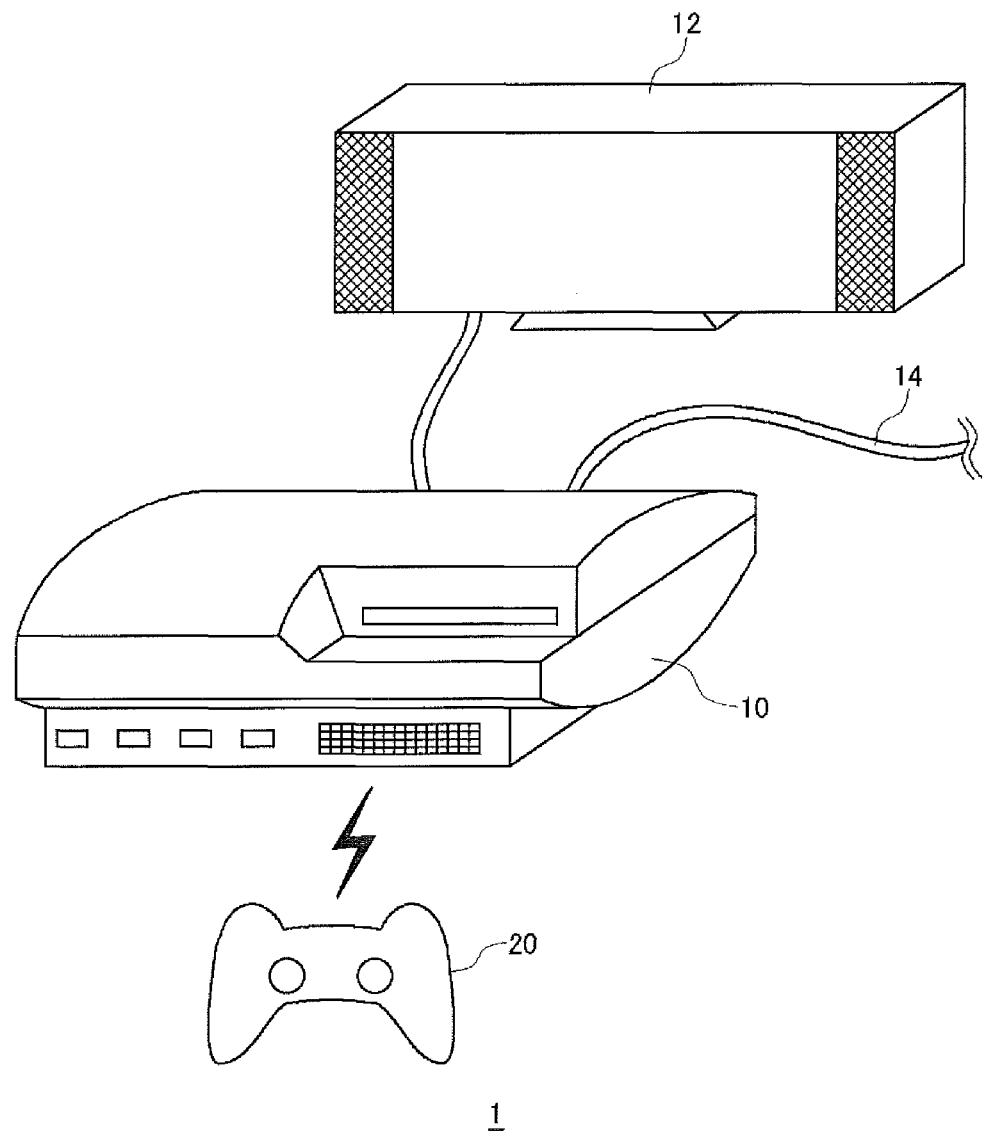
FIG. 1 shows an environment in which the information processing system according to an embodiment of the present invention is used.

FIG. 1 shows an environment in which the information processing system 1 according to an embodiment of the present invention is used. The information processing system 1 comprises an input device 20, an information processing device 10 configured to execute an application software and perform image processing, and a display device 12 configured to output a result of processing by the information processing device 10. The display device 12 may be a television set provided with a display for outputting an image and a speaker for outputting sound. The display device 12 may be a computer display. The display device 12 may be connected to the information processing device 10 by cable or connected wirelessly using, for example, wireless LAN (Local Area Network). The information processing device 10, the input device 20, and the display device 12 may be formed integrally. For example, the devices may be configured as a mobile terminal provided with image processing function.

The information processing device 10 in the information processing system 1 may be connected to an external network such as the Internet by a cable 14 and download and acquire, for example, hierarchical compressed image data. The information processing device 10 may be connected to an external network wirelessly.

The information processing device 10 executes application software (hereinafter, simply referred to as "application"). For example, applications executed include a graphical user interface (GUI) application, a game application, etc. The information processing device 10 displays on the display of the display device 12 a control panel image that aids user control on an application. The user views the control panel image and operates the input device 20. The user control information, which is generated by the input device in response to user operation, is transmitted to the information processing device 10. The information processing device 10 executes an application based on the user control information which is input to the control panel image.

The information processing device 10 is also provided with image processing function for generating an information image including information related to an application. The information processing device 10 maintains image data including at least one compressed tile image for each of the different resolutions and generates an information image using the image data. The information processing device 10 may be a game device that runs a GUI application or a game application, and the image processing function may be achieved by loading a program for image processing. The information processing device 10 may be a personal computer capable of running various applications and the image processing function may be achieved by loading a program for image processing.

The information processing device 10 changes an information image in accordance with a user request which is input to the input device 20. For example, the information processing device 10 enlarges/reduces the information image or moves the image upward, downward, leftward, or rightward, which is being displayed on the display device 12. As the user manipulates the input device 20 by viewing an information image displayed on the display, the input device 20 transmits a signal for requesting a change of the information image to the information processing device 10.

Figure 2:
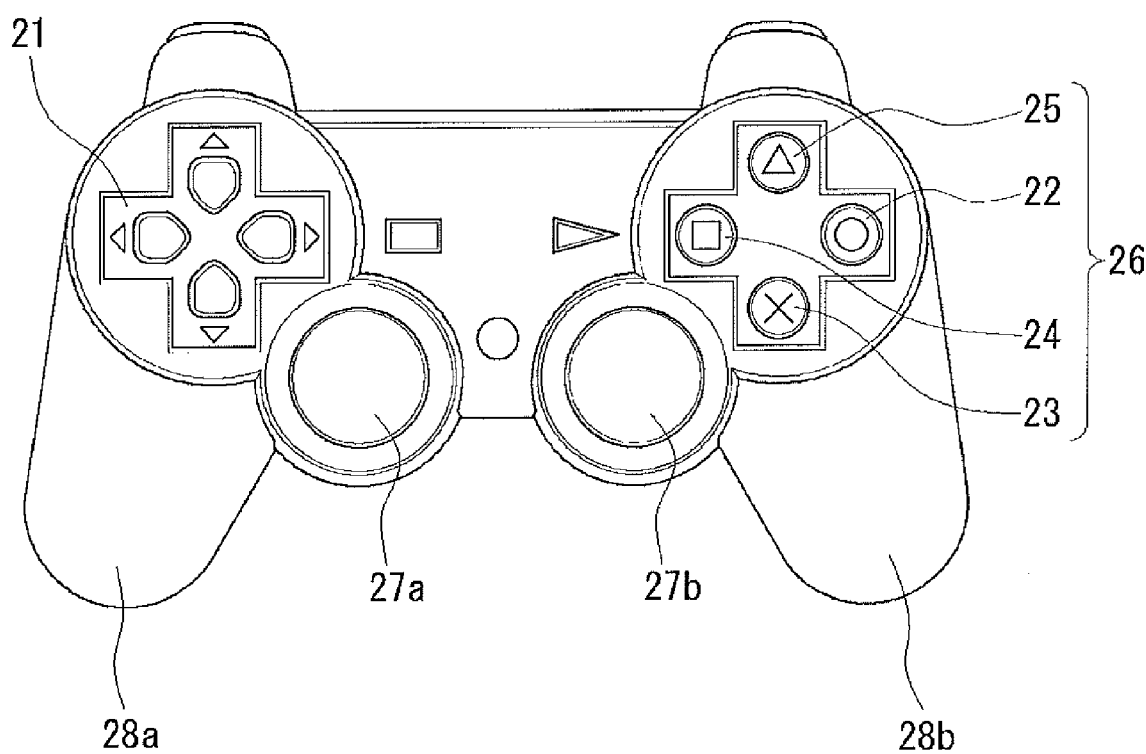
FIG. 2 shows the appearance of the input device.

FIG. 2 shows the appearance of the input device 20. The input device 20 is provided with directional keys 21, analog sticks 27a, 27b, and four control buttons 26, which are means for user control. The four buttons 26 comprise a circle button 22, a cross button 23, a square button 24, and a triangle button 25. While an application is being run, the means for control in the input device 20 is assigned the function of entering user control information via the control panel image displayed to control the application.

While the control panel image is being displayed, the means for control in the input device 20 is assigned the function of entering a request to switch from the control panel image to an information image including information related to the application, in addition to the function of entering user control information via the control panel image. For example, the square button 24 may be assigned the function of entering a request to switch the displayed image. When the user presses the square button 24 while a control panel image is being displayed on the display, the displayed image is switched and an information image is displayed on the display.

After the information processing device 10 of the information processing system 1 switches the control panel image to the information image, the user control means of the input device 20 is assigned the function of entering a request to enlarge/reduce the information image, and entering a request to scroll upward, downward, leftward, or rightward. For example, the function of entering a request to enlarge/reduce an information image may be allocated to the right analog stick 27b. The user can enter a request to reduce an information image by pulling the analog stick 27b toward the user and can enter a request to enlarge an information image by pushing it away from the user. The function of entering a request for scrolling may be allocated to the directional keys 21. By pressing the directional key 21, the user can enter a request for scrolling in the direction in which the directional keys 21 are pressed. The function of entering a request to change an image may be allocated to alternative user control means. For example, the function of entering a request for scrolling may be allocated to the analog stick 27a.

The input device 20 has the function of transferring an input signal for requesting a change of an image to the information processing device 10. In the embodiment, the input device 20 is configured to be capable of communicating with the information processing device 10 wirelessly. The input device 20 and the information processing device 10 may establish communication using the Bluetooth (registered trademark) protocol or the IEEE802.11 protocol. The input device 20 may be connected to the information processing device 10 via a cable so as to transfer a signal for requesting a change of an image to the information processing device 10.

Figure 3:
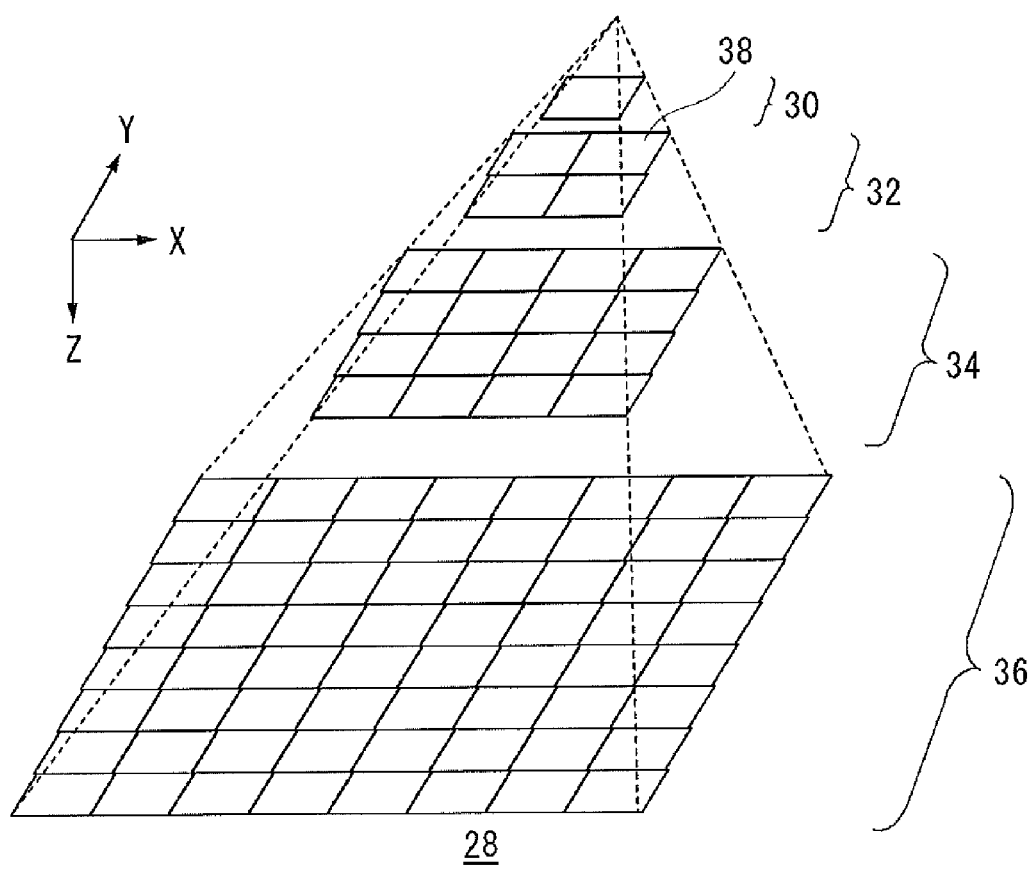
FIG. 3 shows the hierarchical structure of image data used in the information processing system.

FIG. 3 shows the hierarchical structure of image data used in the information processing system 1. The information processing device 10 uses the image data to generate an information image. The image data has a hierarchical structure comprising a 0-th layer 30, a first layer 32, a second layer 34, and a third layer 36 in the direction of depth (Z axis). Hereinafter, image data having such a hierarchical structure will be referred to as "hierarchical data". Layer higher than the fourth layer may be provided. The hierarchical data shown in FIG. 3 has a quadtree hierarchical structure. Each layer comprises one or more tile images 38. All of the tile images 38 are formed to have the same size having the same number of pixels. For example, an image has 256×256 pixels. The image data in the respective layers are representations of an image in different resolutions. The original image in the third layer 36 having the highest resolution is reduced in a plurality of stages to generate the image data for the second layer 34, the first layer 32, and the 0-th layer 30. For example, the resolution in the Nth layer (N is an integer equal to or greater than 0) may be ½ the resolution of the (N+1)th layer in both the horizontal (X axis) direction and the vertical (Y axis) direction.

In the hierarchical data structure shown in FIG. 3, the position in the depth (Z axis) direction indicates the resolution. The closer to the 0-th layer 30, the lower the resolution, and, the closer to the third layer 36, the higher the resolution. In terms of the size of the image displayed on the display, the position in the depth direction represents the scale. Assuming that the scaling factor of the displayed image in the third layer 36 is 1, the scaling factor in the second layer 34 is ¼, the scaling factor in the first layer 32 is ¹⁄₁₆, and the scaling factor in the 0-th layer 30 is ¹⁄₆₄. Therefore, if the displayed image changes in the depth direction away from the 0-th layer 30 toward the third layer 36, the displayed image is enlarged. If the displayed image changes in the direction away from the third layer 36 toward the 0-th layer 30, the displayed image is reduced.

In the information processing device 10, the hierarchical data 28 is compressed in a predefined compression format, stored in a storage device, and read from the storage device and decoded before being displayed on the display. Compression of the hierarchical data may be performed for each tile image. Alternatively, a plurality of tile images included in the same layer or a plurality of layers may be compressed at a time.

As shown in FIG. 3, the hierarchical structure of hierarchical data 28 is configured such that the horizontal direction is defined along the X axis, the vertical direction is defined along the Y axis, and the depth direction is defined along the Z axis, thereby building a virtual three-dimensional space. In the hierarchical structure, the X axis and the Y axis define a common coordinate system whose original point is fixed. Upon deriving the amount of change of an information image by referring to a request to change an image supplied from the input device 20, the information processing device 10 uses the amount of change to derive information identifying a layer and texture coordinates (UV coordinates) in the layer. The combination of the information identifying the layer and the texture coordinates will be referred to as spatial coordinates. Spatial coordinates in a virtual space are used to generate an information image. The information processing device 10 may derive the coordinates of the four corners of a frame image in the virtual space by using the amount of change of an information image. The frame coordinates of the four corners will also be referred to as spatial coordinates. The information processing device 10 may drive the coordinates (X, Y) of the center of the frame image in the virtual space and the scale (SCALE). The information processing device 10 may identify an area for use in the tile image 38 of a relevant layer by referring to the signal for requesting the change of the image supplied from the input device 20. The manner of identification is non-limiting.

Figure 4:
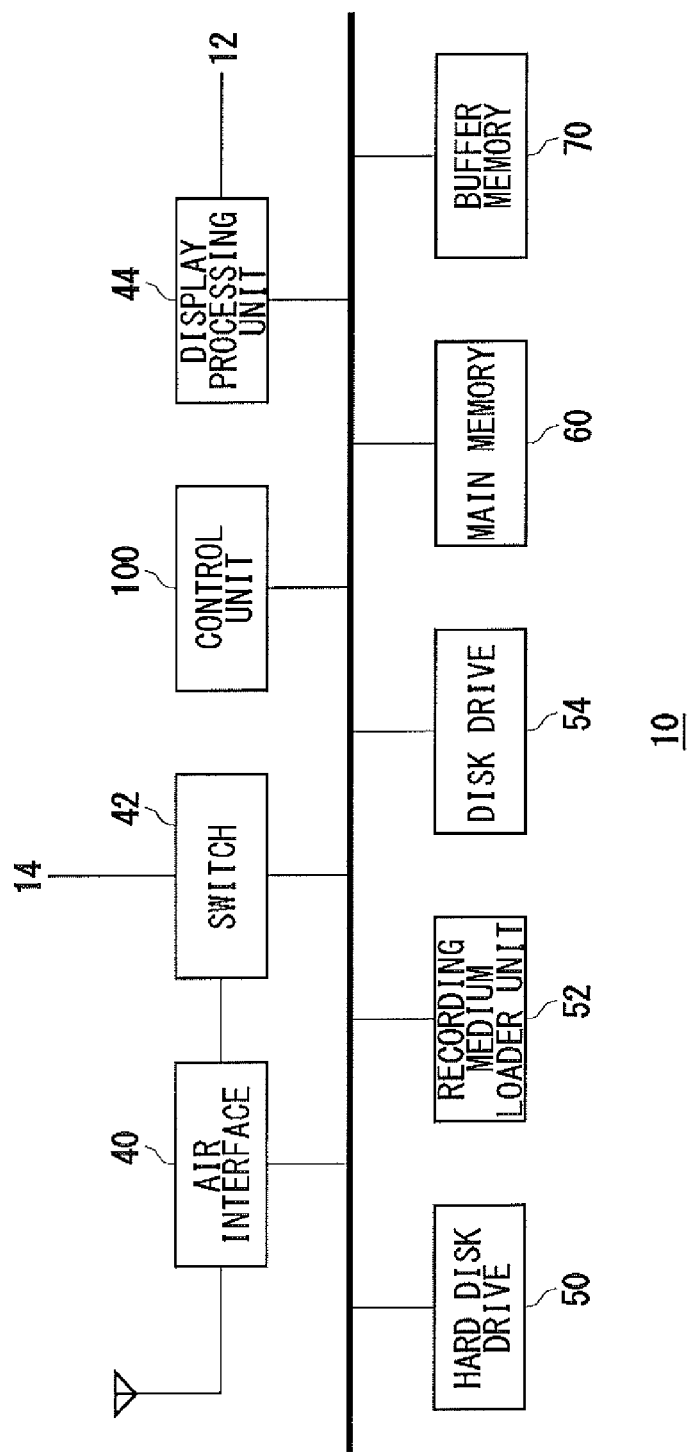
FIG. 4 is a functional block diagram of the information processing device.

FIG. 4 is a functional block diagram of the information processing device 10. The information processing device 10 comprises an air interface 40, a switch 42, a display processing unit 44, a hard disk drive 50, a recording medium loader unit 52, a disk drive 54, a main memory 60, a buffer memory 70, and a control unit 100. The display processing unit 44 is provided with a frame memory for buffering data to be displayed on the display of the display device 12.

The switch 42 is an Ethernet switch (Ethernet is a registered trademark), a device connected to an external device by cable or wirelessly so as to transmit and receive data. The switch 42 may be connected to an external network via the cable 14 so as to receive hierarchized compressed image data from an image server. The switch 42 is connected to the air interface 40. The air interface 40 is connected to the input device 20 using a predefined wireless communication protocol. The signal for requesting the change of the image, which is input by the user via the input device 20, is supplied to the control unit 100 via the air interface 40 and the switch 42.

The hard disk drive 50 functions as an auxiliary storage device for storing data. The compressed image data received via the switch 42 may be stored in the hard disk drive 50. The compressed image data stored in the hard disk drive 50 is read into the main memory 60 for display processing. When a removable recording medium such as a memory card is mounted, the recording medium loader unit 52 reads data from the removable recording medium. When a ROM disk is mounted, the disk drive 54 drives and recognizes the ROM disk so as to read data. The ROM disk may be an optical disk or a magneto-optical disk. The compressed image data may be preinstalled in the hard disk drive 50. Alternatively, the compressed image data may be stored in a removable recording medium or a ROM disk and read into the main memory 60 to be subject to display processing.

The control unit 100 is provided with a multicore CPU. One general-purpose processor core and a plurality of simple processor cores are provided in a single CPU. The general-purpose processor core is referred to as a power processing unit (PPU) and the other processor cores are referred to as synergistic-processing units (SPU).

The control unit 100 is provided with a memory controller connected to the main memory 60 and the buffer memory 70. The PPU is provided with a register and a main processor as an entity of execution. The PPU efficiently allocates tasks as basic units of processing in applications to the respective SPUs. The PPU itself may execute a task. The SPU is provided with a register, a subprocessor as an entity of execution, and a local memory as a local storage area. The local memory may be used as the buffer memory 70. The main memory 60 and the buffer memory 70 are storage devices and are formed as random access memories (RAM). The SPU is provided with a dedicated direct memory access (DMA) controller and is capable of high-speed data transfer between the main memory 60 and the buffer memory 70. High-speed data transfer is also achieved between the frame memory in the display processing unit 44 and the buffer memory 70. The control unit 100 according to the embodiment implements high-speed image processing function by operating a plurality of SPUs in parallel. The display processing unit 44 is connected to the display device 12 and outputs a result of image processing in accordance with user request.

Figure 5:
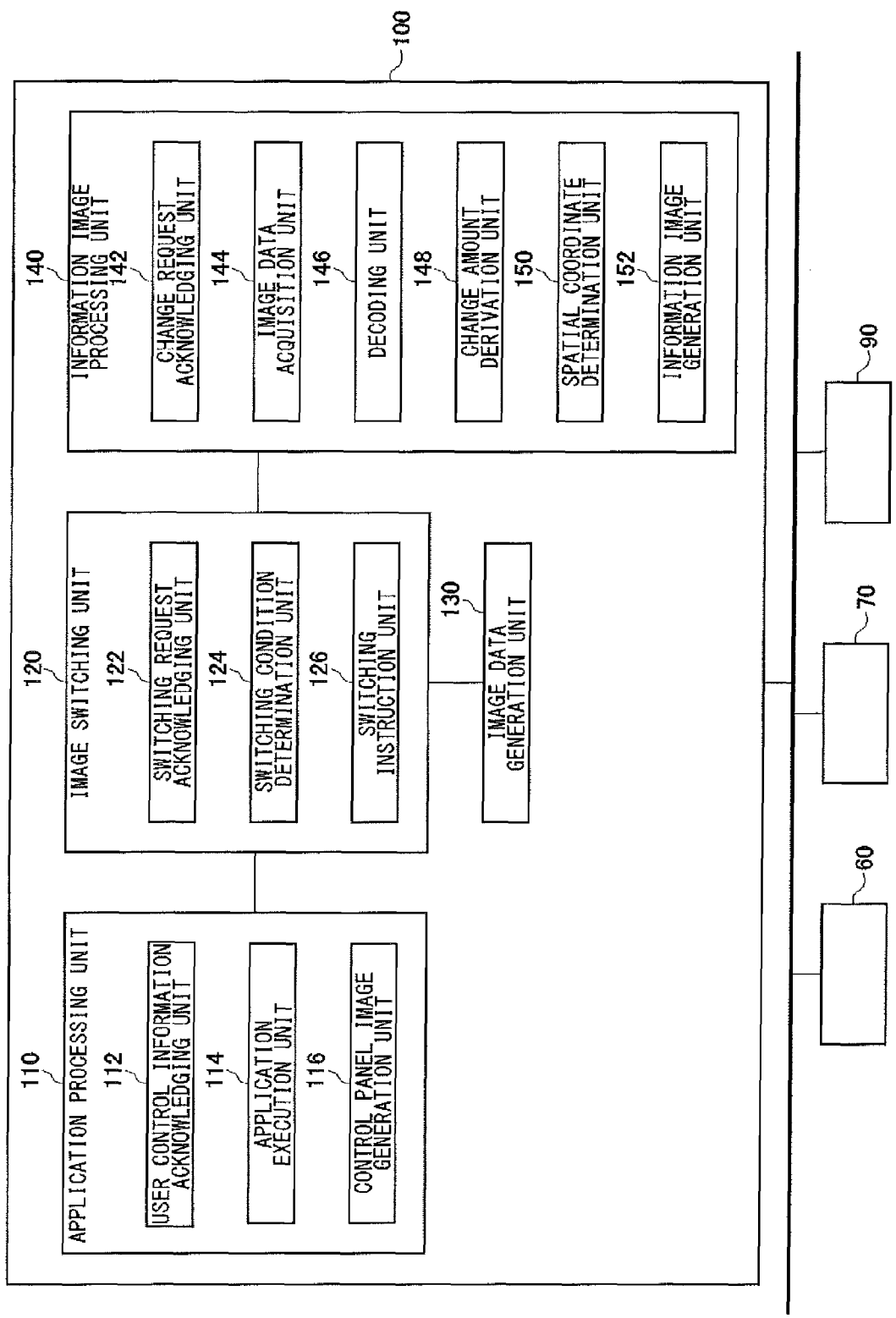
FIG. 5 shows the configuration of the control unit in the image processing device.

FIG. 5 shows the configuration of the control unit 100 in the information processing device 10. The control unit 100 comprises an application processing unit 110, an image switching unit 120, an image data generation unit 130, and an information image processing unit 140. The application processing unit 110 generates a control panel image indicating the status of execution of an application and comprises a user control information acknowledging unit 112, an application execution unit 114, and a control panel image generation unit 116. The image switching unit 120 switches between a control panel image and an information image and comprises a switching request acknowledging unit 122, a switching condition determination unit 124, and a switching instruction unit 126. The image data generation unit 130 is provided with a screen capturing function of a control panel image. The image data generation unit 130 reconstructs image data by using a screen shot of the control panel image. The information image processing unit 140 is provided with a function of generating an information image and changing an information image, and comprises a change request acknowledging unit 142, an image data acquisition unit 144, a decoding unit 146, a change amount derivation unit 148, a spatial coordinate determination unit 150, and an information image generation unit 152.

The elements depicted in FIG. 5 as functional blocks for performing various processes are implemented by hardware such as a CPU, a main memory, or other LSI's, and by software such as a programs etc., loaded into the main memory. As described above, the control unit 100 is provided with a single PPU and a plurality of SPU's. The PPU and the SPU's embody the functions either alone or in combination. Therefore, it will be obvious to those skilled in the art that the functional blocks may be implemented in a variety of manners by a combination of hardware and software.

In the information processing system 1, the information processing device 10 runs a GUI application that allows user operations such as playing back, deleting, or editing of a recorded television program, or transfer of a program to another terminal. In a control panel image of this application, an icon image and a title of a recorded image content are displayed. A list of user operation items available for the selected image content is also displayed.

Figure 6:
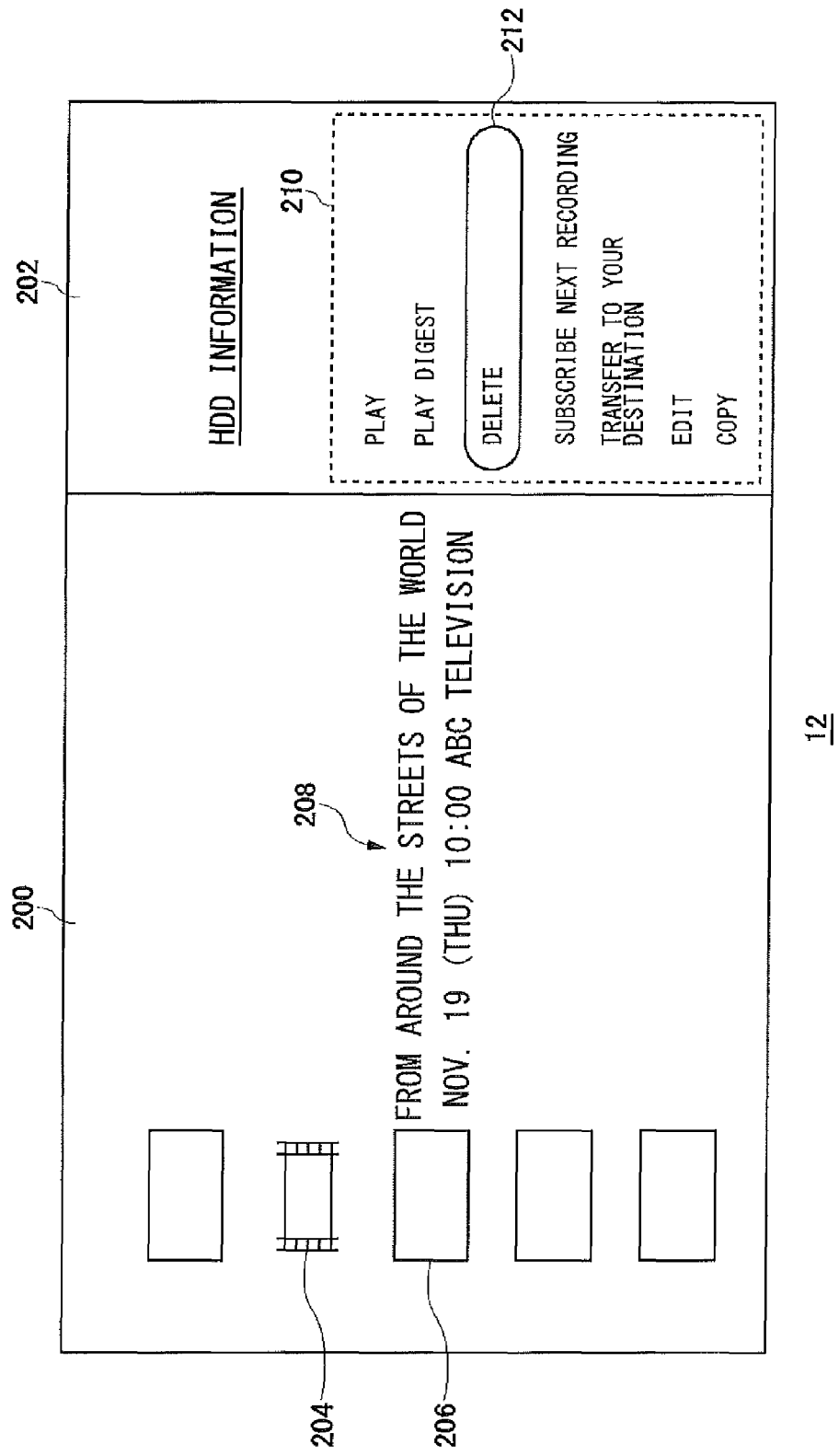
FIG. 6 shows an example of control panel image displayed to control a GUI application.

FIG. 6 shows an example of control panel image displayed to control a GUI application. The control panel image shown in the display device 12 is divided into a content display area 200 and a user operation item display area 202. A video icon 204 is arranged in the content display area 200. Content icons showing recorded television programs are located above or below the video icon 204. A content icon 206 subject to control is arranged immediately below the video icon 204. The user can change the arrangement of content icons by manipulating the directional keys 21 of the input device 20 upward or downward.

A user operation item list 210 listing items of user operations available for the content is displayed in the user operation item display area 202. The user can make a user operation item included in the user operation item list 210 selectable by selecting a content in the content display area 200 and pressing a predetermined button of the input device 20. A selection indicator 212 is moved upward or downward through the user operation item list 210 to select a desired user operation item. In the illustrated example, a "delete" operation is selected. The above-described steps are performed by the application processing unit 110 shown in FIG. 5.

Initially, the control panel image generation unit 116 in the application processing unit 110 generates an initial image of a control panel image. Arrangement of content icons in an initial image is arbitrary, and, for example, the selection indicator 212 highlights "play back" at the top of the user operation item list 210. According to user manipulation of the input device 20, the user control information acknowledging unit 112 acknowledges user control information. The application execution unit 114 generates an instruction for changing the arrangement of content icons, and generates an instruction for moving the selection indicator 212 by referring to the input user control information. The control panel image generation unit 116 generates a control panel image by referring to an instruction from the application execution unit 114 and causes the display processing unit 44 to output the control panel image from the display device 12.

For example, when the circle button 22 of the input device 20 is pressed while the control panel image shown in FIG. 6 is being displayed, the user control information acknowledging unit 112 acknowledges the user control information and the application execution unit 114 deletes the content identified by the content icon 206. In this example, the circle button 22 is assigned the function of an Enter button.

Users not experienced with the GUI application and attempting to delete a content may want to know information such as the steps of deletion or caution to be taken. For example, if the user wants to delete only the first half of the content "from around the streets of the world" identified by descriptive information 208 and expects that a "deletion" operation is capable of deleting only a part of the content, the user will be in trouble if the entirety of the content is deleted. Therefore, the user would like an opportunity to access the manual for "delete" operation before performing a delete operation.

To address the requirement, the information processing device 10 provides the user with an information image including information related to an application. In this example, the information image is an image of a manual that explains operations available in the GUI application. By providing the image of the manual, the user can know the details about "delete" operation. Switching processing from a control panel image to an information image is executed by the image switching unit 120 shown in FIG. 5.

When a predetermined user input is provided (e.g., the square button 24 of the input device 20 is pressed) while the control panel image shown in FIG. 6 is being displayed, the switching request acknowledging unit 122 acknowledges the user control information as a request to switch the displayed image. The switching instruction unit 126 causes the information on the control panel image, which is displayed when the square button 24 is pressed, to be stored in a storage device such as the buffer memory 70. This is to allow the user who has finished reading the manual to return to the control panel image as originally displayed. Further, the switching instruction unit 126 supplies an instruction for switching including information indicating a selected user operation item (hereinafter, referred to as "selected item information") to the information image processing unit 140.

When the change request acknowledging unit 142 acknowledges an instruction for switching, the hierarchical data is read from the hard disk drive 50 and stored in the main memory 60. The image data acquisition unit 144 refers to the selected item information and reads the tile image used to generate an information image from the main memory 60. The initial image of the manual image is predefined for each of the selected item information. The image data acquisition unit 144 can identify the tile image that should be read accordingly. The decoding unit 146 decodes the tile image and causes the buffer memory 70 to store the decoded image. The spatial coordinate determination unit 150 determines the texture coordinates by referring to the spatial coordinates predefined for the initial image. The information image generation unit 152 refers to the texture coordinates and uses the tile image stored in the buffer memory 70 to generate an information image, and supplies the generated image to a frame memory 90 of the display processing unit 44. In this process, the information image generation unit 152 generates an information image including a thumbnail image corresponding to the control panel image.

Figure 7:
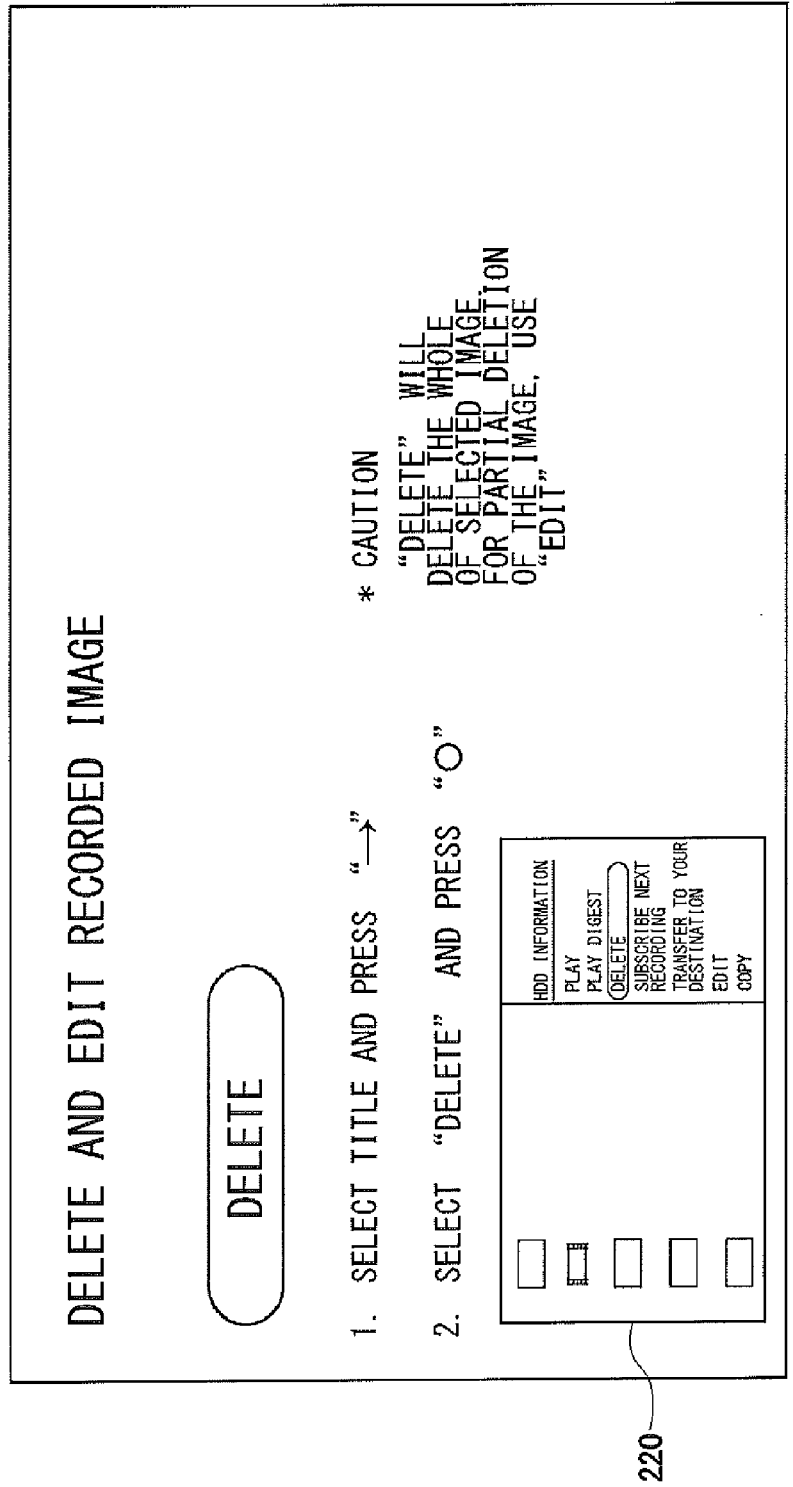
FIG. 7 shows an initial image of an electronic manual defined for the control panel image shown in FIG. 6.

FIG. 7 shows an initial image of an electronic manual defined for the control panel image shown in FIG. 6. In the initial image, part of the manual regarding "delete" operation is displayed. The initial image of the electronic manual includes a thumbnail image 220 corresponding to the control panel image. By including the thumbnail image 220 in the information image, the user can know that an electronic manual associated with the control panel image shown in FIG. 6, i.e., the manual for "delete" operation, is displayed.

As the user uses the analog stick 27 or the directional keys 21 of the input device 20, the signal for requesting the change of the image is transmitted to the information processing device 10. The change request acknowledging unit 142 acknowledges from the input device 20 the signal for requesting the change of the information image displayed on the display.

The image data acquisition unit 144 reads from the main memory 60 a tile image used to generate an information image, by referring to the signal for requesting the change. The decoding unit 146 decodes the tile image and causes the buffer memory 70 to store the image. For example, it is desirable that the image data acquisition unit 144 predicts the scaling factor of the image requested by the signal, prefetch one or more tile images expected to be needed in the future, and causes the buffer memory 70 to store the prefetched image.

The change amount derivation unit 148 refers to the requesting signal and derives the amount of change of the information image requested to be displayed. The amount of change of the information image comprises the amount of frame-by-frame movement in the vertical and horizontal directions and in the depth direction. The spatial coordinate determination unit 150 determines the texture coordinates of the current frame resulting from the movement from the texture coordinates of the previous frame by the amount of change as derived. The information image generation unit 152 refers to the texture coordinates and uses the tile image stored in the buffer memory 70 to generate the information image and supplies the generated image to the frame memory 90 of the display processing unit 44.

If the user wishes to completely delete an image content, the user may read the manual for "delete" operation by scrolling the information image (manual image) shown in FIG. 7 downward. This allows the user to perform a "delete" operation, fully understanding the content of "delete" operation.

The information image generation unit 152 may directly switch the control panel image shown in FIG. 6 to the initial image of the electronic manual shown in FIG. 7. Alternatively, the control panel image shown in FIG. 6 may be allowed to zoom out gradually and switched to the initial image of the manual shown in FIG. 7.

When the change request acknowledging unit 142 acknowledges a request for switching, the hierarchical data is read from the hard disk drive 50 and stored in the main memory 60. The image data acquisition unit 144 reads from the main memory 60 a tile image used to generate an information image showing the same range as the control panel image shown in FIG. 6, by referring to the selected item information. The decoding unit 146 decodes the tile image and causes the buffer memory 70 to store the image. The spatial coordinate determination unit 150 determines the texture coordinates of an information image corresponding to the control panel image shown in FIG. 6. The information image generation unit 152 refers to the texture coordinates and uses the tile image stored in the buffer memory 70 to generate an information image of the same size as the control panel image shown in FIG. 6 and supplies the generated image to a frame memory 90 of the display processing unit 44. In this process, the information image generation unit 152 generates an information image showing a thumbnail image 220 of the control panel image shown in FIG. 6 on the entirety display.

The thumbnail image 220 is a template image of the control panel image shown in FIG. 6 and is configured to be extremely similar to the control panel image. However, the thumbnail image 220 does not include the descriptive information 208 included in the control panel image and so is not identical to the control panel image. For this reason, the information image generation unit 152 may ensure that that the user does not experience discontinuity associated with image transition by crossfading between images, causing the original control panel image to fade out and causing the thumbnail image 220 to fade in.

Thus, the information image generation unit 152 generates an information image that shows the thumbnail image 220 full screen, and then reduces the thumbnail image 220 so that thumbnail image 220 is located in a predetermined area other than the center. More specifically, the information image generation unit 152 reduces the thumbnail image displayed full screen and generates the initial image of the electronic manual shown in FIG. 7. If the thumbnail image 220 displayed full screen is simply reduced, an electronic manual in which the thumbnail image 220 is located at the center is displayed on the display. By configuring the initial image of the electronic manual in advance and causing the displayed image to make transition while moving the thumbnail image 220 displayed full screen in a certain direction (in this case, toward bottom left) to result in the initial image as configured, the user can easily access a desired electronic manual without experiencing any uncomfortableness.

Meanwhile, transition from the electronic manual to the control panel image shown in FIG. 6 can be achieved by enlarging the thumbnail image 220. When the user uses the input device 20 to enter a request to enlarge the thumbnail image 220, the information image generation unit 152 enlarges the thumbnail image 220 based on the signal for requesting the change. The switching condition determination unit 124 in the image switching unit 120 stores a condition for switching from the information image to the control panel image and monitors whether the condition for switching holds while the information image is being displayed. For example, the switching condition is that the thumbnail image 220 is displayed at a predetermined scale or larger. The switching condition determination unit 124 monitors the scale of the information image and, when the scale exceeds a predetermined scale, determines that the condition for switching holds. The switching condition may be that the ratio by which the thumbnail image 220 occupies the display exceeds a predetermined value. The ratio of occupation is defined as a ratio of the number of pixels occupied by the thumbnail image 220 with respect to the number of pixels in the entire display. For example the switching condition determination unit 124 determines that the condition for switching holds if the ratio of occupation exceeds 60%. The switching instruction unit 126 stores information on the control panel image occurring immediately before the control panel image is switched to the information image. If the switching instruction unit 126 determines that the thumbnail image 220 displayed on an enlarged scale matches the control panel image information as stored, the switching instruction unit 126 supplies an instruction for switching, including the control panel image information, to the control panel image generation unit 116 of the application processing unit 110.

The control panel image generation unit 116 in the application processing unit 110 generates the control panel image shown in FIG. 6 based on the supplied control panel image information. The user can use the knowledge acquired from the manual to perform an operation of "deleting" the content, fully knowing what the user is doing.

When the switching condition determination unit 124 determines that the condition for switching holds, the control panel image generation unit 116 may immediately generate the control panel image. Alternatively, the information image generation unit 152 may generate an image showing the thumbnail image 220 gradually zoomed in, before initiating transition to the control panel image, so as to secure continuity of images. More specifically, the information image generation unit 152 may initially display the information image occurring when the condition for switching holds, and enlarges the displayed image until the information image shows the thumbnail image 220 full screen. When the thumbnail image 220 is displayed full screen, the control panel image generation unit 116 crossfades between the thumbnail image 220 displayed full screen and the control panel image shown in FIG. 6. In other words, the control panel image generation unit 116 may ensure that that the user does not experience discontinuity associated with transition between images, by crossfading between images, causing the thumbnail image 220 to fade out and causing the control panel image shown in FIG. 6 to fade in.

Thus, the information image generation unit 152 enlarges the thumbnail image 220 after the condition for switching holds until the thumbnail image 220 is displayed full screen. More specifically, the information image generation unit 152 initiates transition to the full-screen view of the thumbnail image 220, moving the information image occurring when the condition for switching holds in a certain direction. The control panel image generation unit 116 crossfades between the thumbnail image 220 and the control panel image shown in FIG. 6. In this way, the user can easily view the switching from the electronic manual to the control panel image without experiencing uncomfortableness.

A request for switching from the information image to the control panel image may be generated in response to a certain user input (e.g., pressing of the square button 24 of the input device 20) in the information image. When the square button 24 of the input device 20 is pressed, the switching request acknowledging unit 122 acknowledges the user control information as a request to switch the displayed image. The switching instruction unit 126 supplies an instruction for switching, including the control panel image information, to the control panel image generation unit 116 of the application processing unit 110. The control panel image generation unit 116 switches the displayed image to the control panel image. In response, the information image generation unit 152 may gradually enlarge the thumbnail image 220 since the pressing of the square button 24, until the thumbnail image is displayed full screen. The control panel image generation unit 116 may crossfade between the thumbnail image 220 and the control panel image shown in FIG. 6 until the control panel image is displayed.

If the user wishes to delete only a part of an image content, the user knows that a video content cannot be deleted partially in a "delete" operation by reading "caution" in the information image (manual image) shown in FIG. 7. The user zooms out the information image (reduces the image) in an attempt to find a manual for "edit" operation. As the user uses the input device 20 to enter a request to reduce the information image, the information image generation unit 152 reduces the information image according to the signal for requesting the change.

Figure 8:
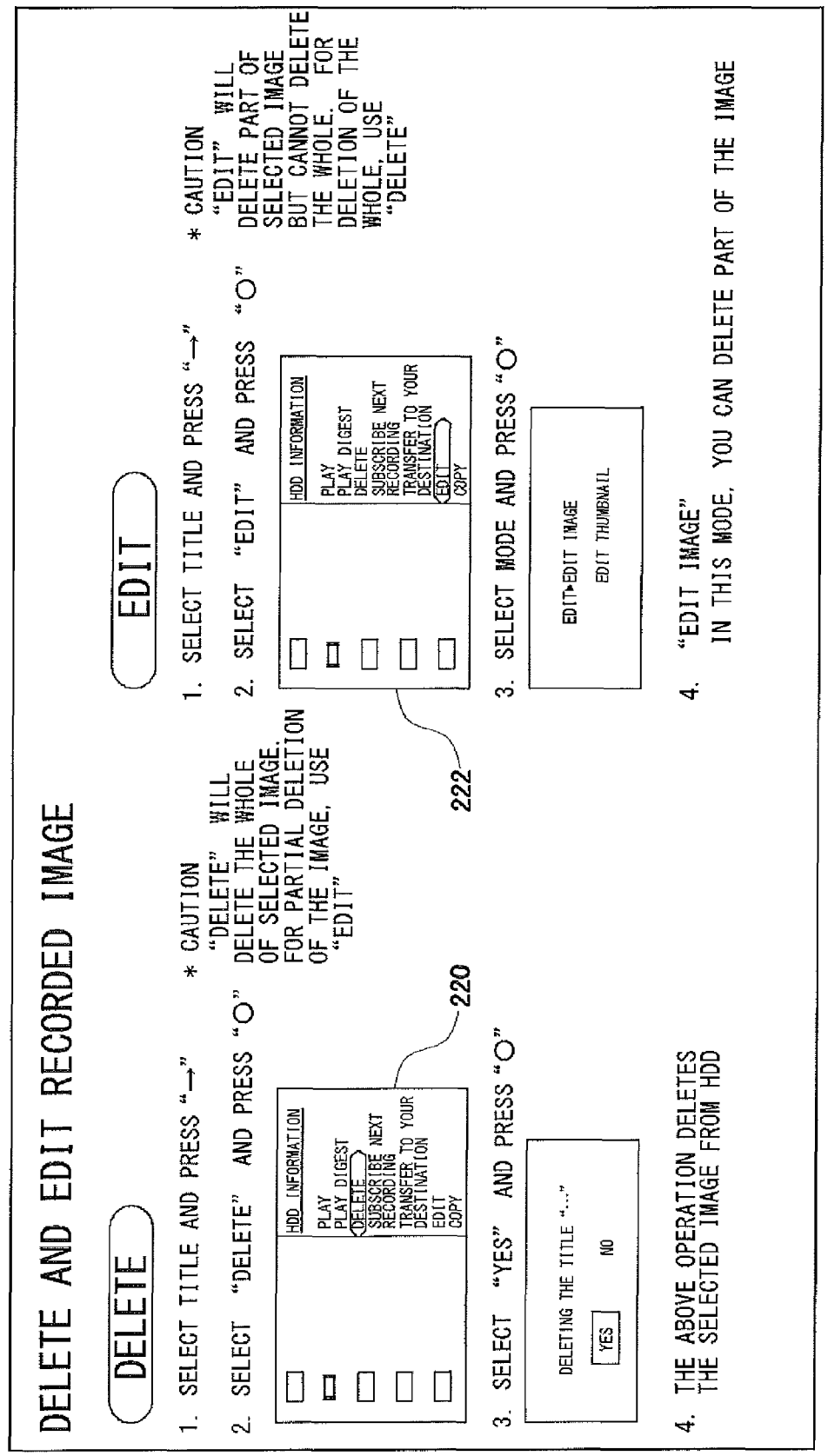
FIG. 8 shows a reduced view of the information image shown in FIG. 7.

FIG. 8 shows a reduced version of the information image shown in FIG. 7. A zoom-out view like this gives the user a perspective of the electronic manual and helps the user find a manual for "edit" located near the manual for "delete" with ease. "Delete" operation and "edit" operation are closely related to each other in terms of the content of operation and it is highly likely that the user reading the manual for "delete" also reads the manual for "edit". Therefore, the manuals are best located close to each other in the image for the electronic manual, as shown in FIG. 8.

The user can easily find information of interest to the user by gaining a perspective of the electronic manual. A related-art electronic manual presents only the information retrieved by a keyword search. However, the information processing system 1 according to the embodiment provides an environment in which the user can not only view desired information but also can easily access other information by scrolling the electronic manual vertically and horizontally. Thus, an electronic manual system highly convenient for users can be provided.

The information image displayed in a reduced scale as shown in FIG. 8 includes not only the thumbnail image 220 corresponding to the control panel image shown in FIG. 6 but also a thumbnail image 222 corresponding to another control panel image. More specifically, the information image generation unit 152 uses image data to generate the thumbnail image 220 corresponding to the control panel image for "delete" and the thumbnail image 222 corresponding to the control panel image for "edit". As the user uses the input device 20 to enter a request to enlarge the manual image for "edit", the information image generation unit 152 enlarges the manual for "edit" according to the signal for requesting the change. The signal for requesting the change includes both a request for enlargement and a request for scrolling rightward.

Figure 9:
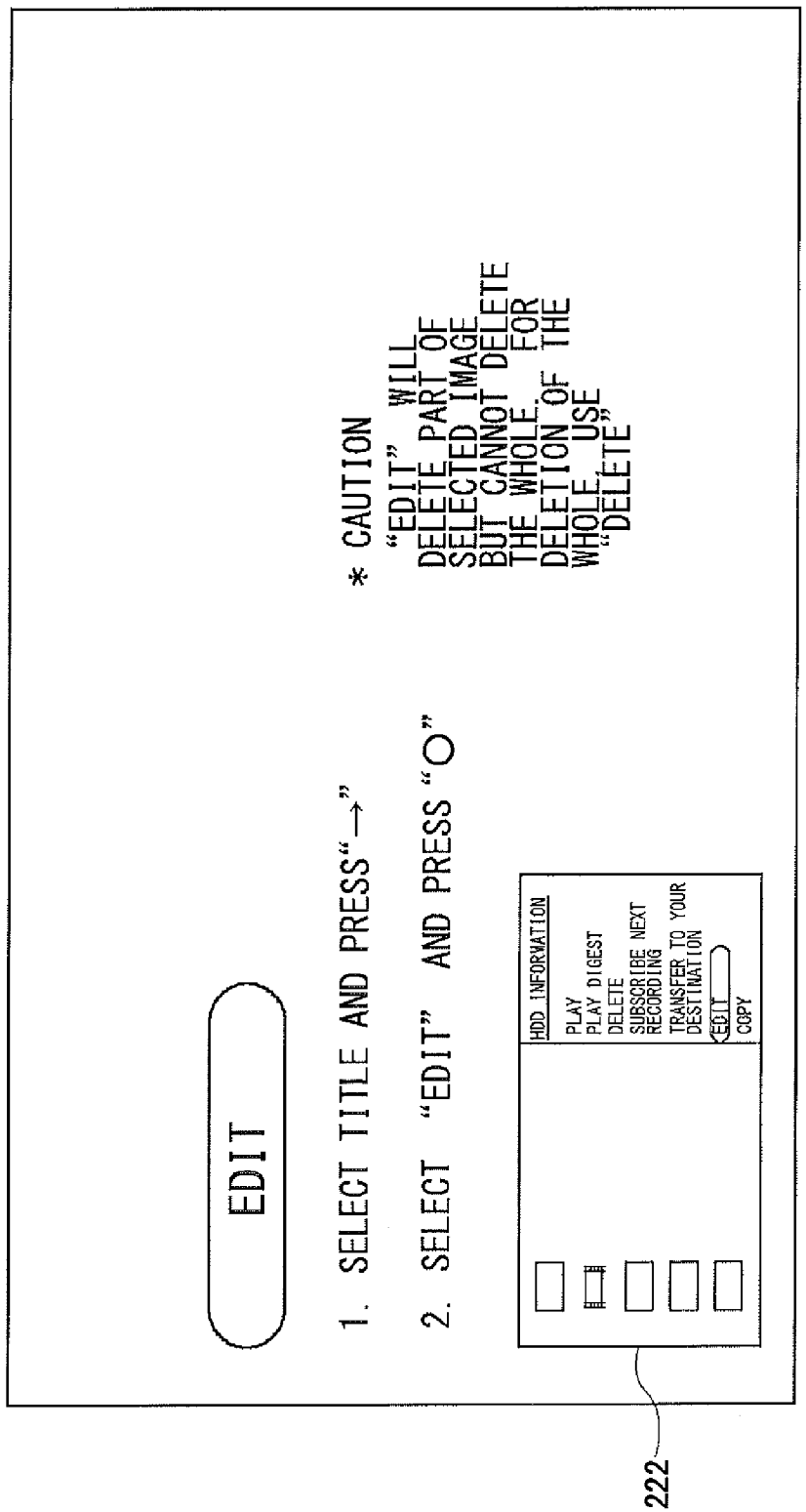
FIG. 9 shows an enlarged view of the information image shown in FIG. 8.

FIG. 9 shows an enlarged version of the information image shown in FIG. 8. The user uses an enlarged view to attain a size in which displayed characters are easy to read. If the user has previous knowledge of the relative positions of the "delete" manual and the "edit" manual shown in FIG. 8, the user can access the manual image shown in FIG. 9 by scrolling the manual image shown in FIG. 7 rightward. The user can read the manual for "edit" operation by scrolling the manual image shown in FIG. 9 vertically. This allows the user to perform an operation of "editing" a content, fully understanding the content of the "edit" operation.

Transition to a control panel image for edit can occur by displaying the thumbnail image 222 on an enlarged scale. When the switching condition determination unit 124 determines that the condition for switching from the information image to the control panel image holds, the switching instruction unit 126 determines whether the thumbnail image 222 displayed on an enlarged scale corresponds to the control panel image information as stored. In this example, the control panel image information as stored corresponds to the thumbnail image 220 and does not correspond to the thumbnail image 222. Therefore, the switching instruction unit 126 supplies a switching instruction, including the control panel image information and identification information identifying the thumbnail image 222, to the application processing unit 110. The identification information identifying the thumbnail image 222 includes information identifying "edit" operation. As described already, when the user presses the square button 24 while the information image shown in FIG. 9 is being displayed, the switching request acknowledging unit 122 may acknowledge the pressing as a request for switching from the information image to the control panel image.

The control panel image generation unit 116 in the application processing unit 110 learns from the supplied control panel image information that "from around the streets of the world" is selected as a content and learns from the identification information identifying the thumbnail image 222 that "edit" operation is the selected as user operation item. This causes the control panel image generation unit 116 to generate the control panel image for edit.

Figure 10:
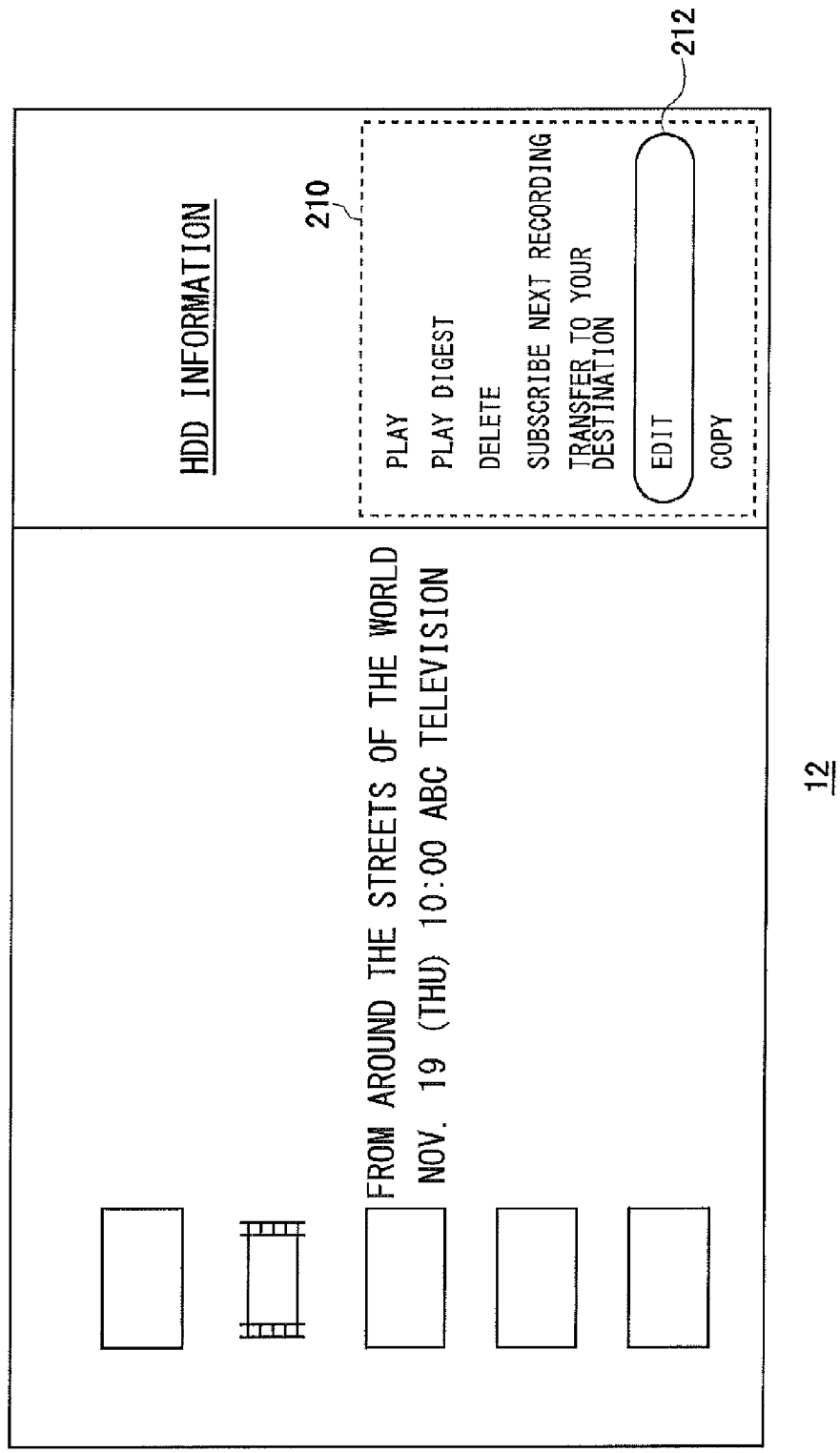
FIG. 10 shows a control panel image for edit.

FIG. 10 shows an edit operation image. In the control panel image for edit as shown, the selection indicator 212 designates "edit" operation. The user can use the knowledge acquired from the manual to partially delete the image content via an edit operation, knowing what the user is doing.

Thus, the information processing device 10 according to the embodiment can produce an electronic manual that the user can use intuitively and that allows the user to access information other than desired information easily, by using image data of a plurality of resolutions to generate the manual. A novel service can also be provided to users in which an application and an electronic manual are seamlessly linked because the user can return to an application by enlarging a thumbnail image included in the electronic manual for the application.

A thumbnail image shown in an information image may be a template image available in advance. Alternatively, a thumbnail image may be created from a screen shot of the control panel image in order to present more smooth transition between a GUI application and an electronic manual.

When the switching instruction unit 126 issues a request for switching the displayed image, the image data generation unit 130 acquires image data for the control panel image and reconstructs the hierarchical data by embedding the image data for the control panel image in the corresponding area in the hierarchical data. This will ensure that the thumbnail image 220 shown in FIG. 7 is a reduced version of the control panel image shown in FIG. 6 and includes the descriptive information 208 (e.g., "from around the streets of the world"). The thumbnail image 220 as displayed remains a reduced version true to the control panel image even after the transition from the control panel image shown in FIG. 6 to the information image shown in FIG. 7. Therefore, the user can read the electronic manual, maintaining the content "from around the streets of the world" in mind. Thus, it is possible to produce an electronic manual suited to the situation of an application by dynamically reconstructing the hierarchical data.

While a thumbnail image other than the thumbnail image 220 (e.g., the thumbnail image 222) is to be shown in the information image, the image data generation unit 130 acquires image data for the corresponding control panel image. When a need arises to generate a thumbnail image other than the thumbnail image 220 as the information image generation unit 152 generates an information image, the information image generation unit 152 provides the control panel image generation unit 116 with the information on the control panel image corresponding to the thumbnail image. When the information is provided, the control panel image generation unit 116 generates a control panel image including the information (e.g., the descriptive information 208 shown) representing the control panel image shown in FIG. 6 and supplies the resultant image to the image data generation unit 130. The image data generation unit 130 acquires the image data and reconstructs the hierarchical data, embedding the image data for the control panel image in the corresponding area in the hierarchical data. This ensures that the thumbnail image 222 shown in FIG. 8 is a reduced version of the control panel image.

The image data generation unit 130 may not reconstruct the hierarchical data to display a screen shot of the control panel image. For example, the information image generation unit 152 may overwrite the relevant area in the information image generated by using a tile image with a screen shot image. In coordination with enlargement and reduction of the information image produced by using the hierarchical data, the information image generation unit 152 enlarges and reduces the screen shot image. This makes it possible to present a screen shot image of the control panel image on the electronic manual, just as in the case where the hierarchical data is reconstructed.

The thumbnail image created from a screen shot of the control panel image may be subject to image processing to let the user know that the thumbnail image is different from the control panel image, in compliance with a policy requiring that an operation on an application is launched only in the control panel image. The user recognize that an application cannot be run from the thumbnail image by displaying the thumbnail image in black and white, in contrast to the control panel image, which is displayed in color. Where the control panel image includes a moving image icon, the thumbnail image may be a still image icon to let the user recognize the distinction.

Figure 11:
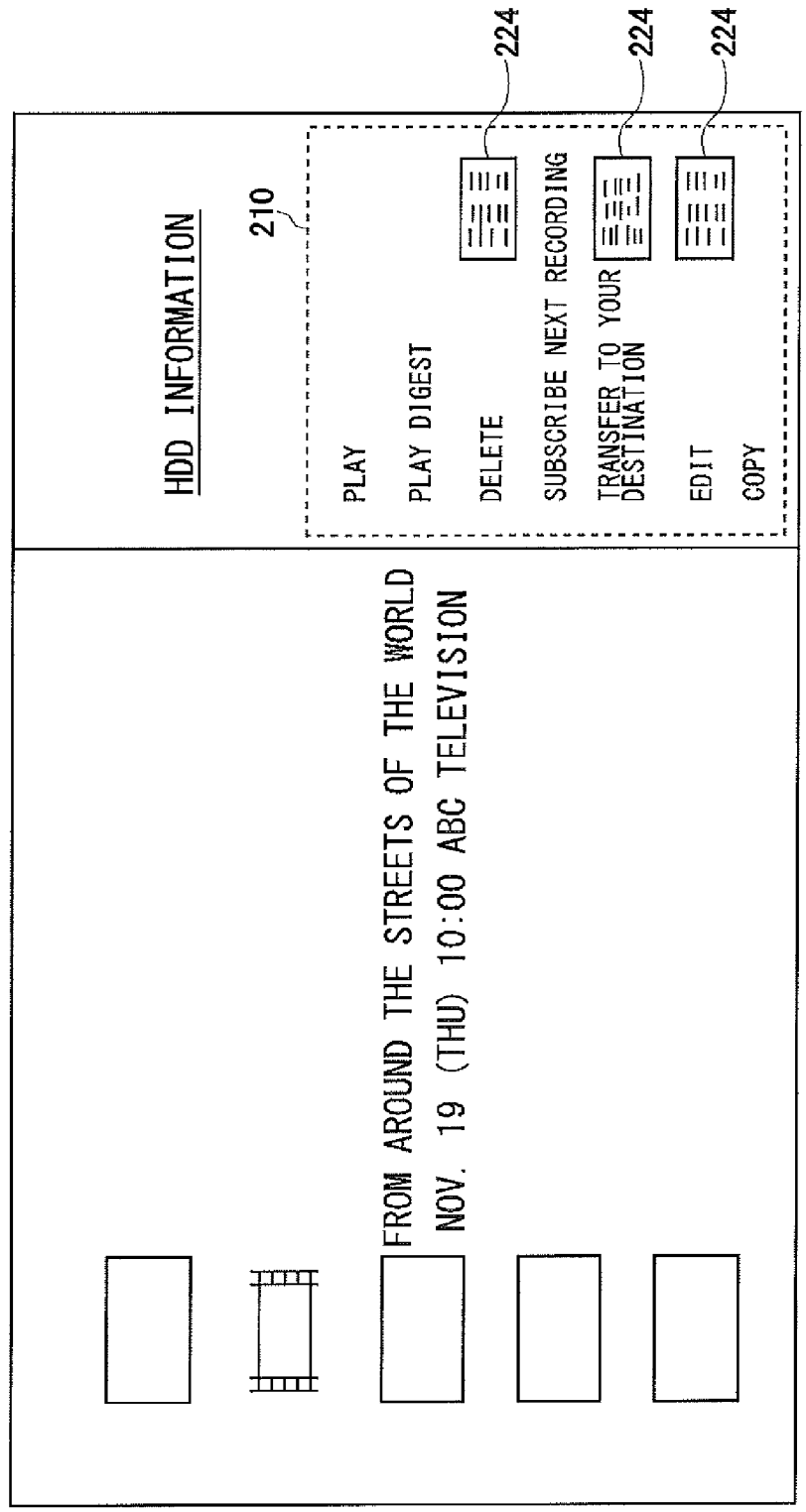
FIG. 11 shows an information image icon.

FIG. 11 shows an information image icon 224. The information image icon 224 is an icon for identifying those of the user operation items included in the user operation item list 210 for which an information image is available. In the illustrated example, the information image icon 224 is defined for user operations "delete", "transfer to your destination", and "edit". The user will therefore recognize that a manual image is available for these operations.

Figure 12:
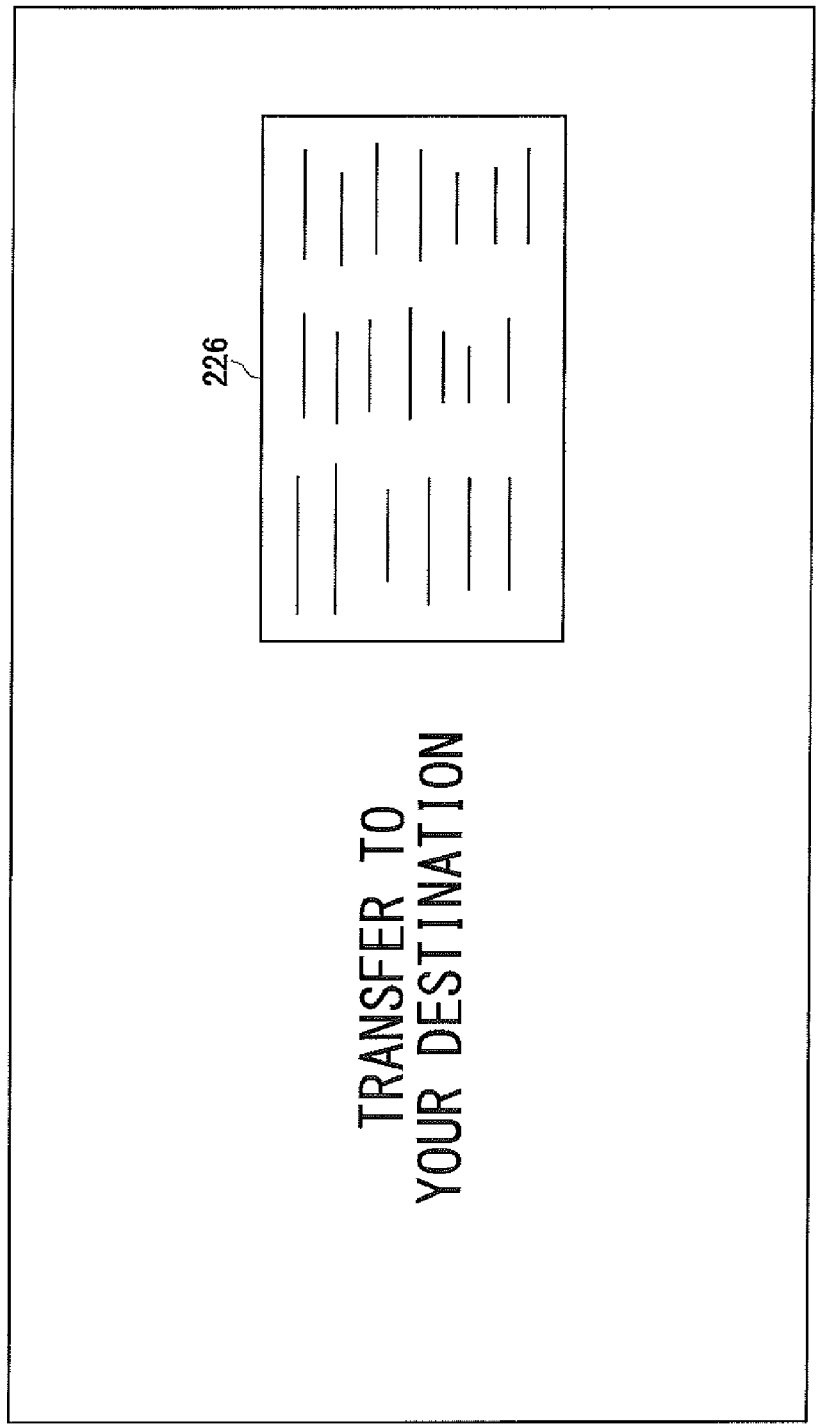
FIG. 12 shows an example of information image displayed when a user operation item for which an information image icon is defined is selected.

FIG. 12 shows an example of information image displayed when a user operation item for which the information image icon 224 is defined is selected. The information image includes a manual image 226 corresponding to the information image icon 224. The manual image 226 is generated from the hierarchical data. The user can size characters, etc. included in the manual image to an easy-to-read size by enlarging the manual image 226.

Described above is an explanation based on an exemplary embodiment. The embodiment is intended to be illustrative only and it will be obvious to those skilled in the art that various modifications to constituting elements and processes could be developed and that such modifications are also within the scope of the present invention.

In the embodiment described above, the user is prevented from running an application from a thumbnail image. Alternatively, a reduced version of the control panel image of an application may be embedded instead of the thumbnail image. This allows the user to run the application directly from the electronic manual and can provide a novel service in which the boundary between an electronic manual and an application is eliminated.

In the embodiment described above, transition to the control panel image corresponding to the displayed thumbnail image occurs when the square button 24 is pressed while the information image is being displayed. One variation addresses a situation in which a plurality of thumbnail images are included in an information image. For example, when the square button 24 is pressed while the information image shown in FIG. 8 is being displayed, the switching request acknowledging unit 122 acknowledges the pressing as a request to switch to the control panel image corresponding to the thumbnail image having a larger number of pixels, of the displayed thumbnail images 220 and 222. If the displayed thumbnail images has the same number of pixels, and if the information image contains the thumbnail image 220 corresponding to the control panel image displayed prior to the transition to the information image, the switching request acknowledging unit 122 acknowledges the pressing as a request to switch to the corresponding control panel image. Meanwhile, if the thumbnail image 220 corresponding to the control panel image displayed prior to the transition to the information image is not included in the information image, the switching request acknowledging unit 122 may acknowledge the pressing as a request to switch to the control panel image corresponding to the thumbnail image located near the center of the screen. Thus, the switching request acknowledging unit 122 maintains a condition for selection indicating which thumbnail image is selected. The switching request acknowledging unit 122 refers to the condition for selection to select a thumbnail image and acknowledges the pressing as a request to switch to the control panel image corresponding to the selected thumbnail image.

In the embodiment described above, the information image generation unit 152 is assumed to generate an information image using the hierarchical data, by way of example. In one variation, the information image generation unit 152 may generate an information image using image data produced by using a digital font such as an outline font. Alternatively, an information image may be generated using a single-layer image data.

In the embodiment described above, a GUI application is described as an example of an application, and an electronic manual is described as an example of an information image. Naturally, combinations different from the one described may be possible. For example, the information processing system 1 may implement a combination of a game application comprising a plurality of stages of questions and a thumbnail image (information image) representing a plurality of stages of questions.

DESCRIPTION OF THE REFERENCE NUMERALS

1 . . . information processing system, 10 . . . information processing device, 12 . . . display device, 20 . . . input device, 44 . . . display processing unit, 50 . . . hard disk drive, 60 . . . main memory, 70 . . . buffer memory, 90 . . . frame memory, 100 . . . control unit, 110 . . . application processing unit, 112 . . . user control information acknowledging unit, 114 . . . application execution unit, 116 . . . control panel image generation unit, 120 . . . image switching unit, 122 . . . switching request acknowledging unit, 124 . . . switching condition determination unit, 126 . . . switching instruction unit, 130 . . . image data generation unit, 140 . . . information image processing unit, 142 . . . change request acknowledging unit, 144 . . . image data acquisition unit, 146 . . . decoding unit, 148 . . . change amount derivation unit, 150 . . . spatial coordination determination unit, 152 . . . information image generation unit, 200 . . . content display area, 202 . . . user operation item display area, 204 . . . video icon, 206 . . . content icon, 208 . . . descriptive information, 210 . . . user operation item list, 212 . . . selection indicator, 220, 222 . . . thumbnail image, 224 . . . information image icon, 226 . . . manual image The present invention is applicable to the field of image processing technology.

The invention claimed is:

1. An information processing device comprising:
a control panel image generation unit configured to generate a control panel image displayed to control an application, wherein the control panel image includes: (i) a plurality of content icons, each content icon representing a respective content file or group of content files, and (ii) a plurality of operation icons, each operation icon representing a corresponding operation or group of operations that may be carried out on the content files;
an execution unit configured to execute the application based on user control information input by selecting at least one of the content icons and at least one of the operation icons while the control panel image is being displayed;
a storage device configured to store image data for generating an information image including information related to the application;
an information image generation unit configured to use the image data stored in the storage device and generate the information image including: (i) indicia representing the at least one of the operation icons that was selected, (ii) indicia representing instructions for carrying out the operation corresponding to the at least one of the operation icons that was selected; and (iii) a thumbnail image of the control panel image;
an image switching unit configured to switch an image displayed on a display between the control panel image and the information image; and
an acknowledging unit configured to acknowledge a signal for requesting a change of the information image displayed on the display,
wherein the information image generation unit modifies the information image to enlarge the thumbnail image based on the signal for requesting the change, and when the thumbnail image is enlarged, the image switching unit switches from the modified information image back to the control panel image and displays the control panel image on the display.

2. The information processing device according to claim 1, wherein the image switching unit causes the information image to be displayed on the display when a predetermined user input is provided while the control panel image is being displayed on the display.

3. The information processing device according to claim 1, wherein:
the information image generation unit generates an information image including a thumbnail image corresponding to another control panel image, and
when the thumbnail image corresponding to the other control panel image is enlarged, the image switching unit displays the other control panel image on the display.

4. The information processing device according to claim 1, wherein the image switching unit displays the control panel image on the display in response to a certain user input provided while the information image is being displayed on the display.

5. The information processing device according to claim 1, wherein the image switching unit switches from the information image to the control panel image when a switching condition related to a display size of the thumbnail image is achieved.

6. The information processing device according to claim 5, wherein, when the image switching unit determines that the switching condition is achieved, the image switching unit displays the control panel image on the display after the information image generation unit generates the information image showing the thumbnail image gradually zoomed in.

7. A method, comprising:
generating a control panel image displayed to control an application, wherein the control panel image includes: (i) a plurality of content icons, each content icon representing a respective content file or group of content files, and (ii) a plurality of operation icons, each operation icon representing a corresponding operation or group of operations that may be carried out on the content files;
executing the application based on user control information input by selecting at least one of the content icons and at least one of the operation icons while the control panel image is being displayed;
generating an information image including: (i) indicia representing the at least one of the operation icons that was selected, (ii) indicia representing instructions for carrying out the operation corresponding to the at least one of the operation icons that was selected; and (iii) a thumbnail image of the control panel image;
switching an image displayed on the display between the control panel image and the information image; and
acknowledging a signal for requesting a change of the information image displayed on the display,
wherein the step of generating the information image includes modifying the information image to enlarge the thumbnail image based on the signal for requesting the change, and the step of switching includes switching from the modified information image back to the control panel image and displaying the control image on the display, when the thumbnail image is enlarged.

8. A non-transitory computer readable recording medium having embodied thereon a program capable of causing a processing system to carry out actions, the program comprising:
a module configured to generate a control panel image displayed to control an application, wherein the control panel image includes: (i) a plurality of content icons, each content icon representing a respective content file or group of content files, and (ii) a plurality of operation icons, each operation icon representing a corresponding operation or group of operations that may be carried out on the content files;
a module configured to execute the application based on user control information input by selecting at least one of the content icons and at least one of the operation icons while the control panel image is being displayed;
a module configured to generate an information image including: (i) indicia representing the at least one of the operation icons that was selected, (ii) indicia representing instructions for carrying out the operation corresponding to the at least one of the operation icons that was selected; and (iii) a thumbnail image of the control panel image;

a module configured to switch an image displayed on the display between the control panel image and the information image; and a module configured to acknowledge a signal for requesting a change of the information image displayed on the display, wherein the module configured to generate the information image includes a module configured to modify the information image to enlarge the thumbnail image based on the signal for requesting the change, and the module configured to switch the image includes a module configured to switch from the modified information image back to the control panel image and to display the control image on the display, when the thumbnail image is enlarged.

* * * * *